(12) United States Patent
Ahn

(10) Patent No.: US 12,053,849 B2
(45) Date of Patent: Aug. 6, 2024

(54) VIBRATION DAMPING SYSTEM AND METHOD FOR ESTIMATING CUTTING FORCE OF MACHINE TOOL USING SAME

(71) Applicant: Foundation of Soongsil University-Industry Cooperation, Seoul (KR)

(72) Inventor: Hyeong Joon Ahn, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 586 days.

(21) Appl. No.: 17/427,549

(22) PCT Filed: Dec. 12, 2019

(86) PCT No.: PCT/KR2019/017574
§ 371 (c)(1),
(2) Date: Jul. 30, 2021

(87) PCT Pub. No.: WO2020/162660
PCT Pub. Date: Aug. 13, 2020

(65) Prior Publication Data
US 2022/0134501 A1 May 5, 2022

(30) Foreign Application Priority Data

Feb. 8, 2019 (KR) .................. 10-2019-0015032
Dec. 6, 2019 (KR) .................. 10-2019-0161550

(51) Int. Cl.
*B23Q 11/00* (2006.01)
(52) U.S. Cl.
CPC ................. *B23Q 11/0032* (2013.01)

(58) Field of Classification Search
CPC ................................ B23Q 11/0032
(Continued)

(56) References Cited

U.S. PATENT DOCUMENTS

| 2008/0118321 A1 | 5/2008 | Sugita et al. |
| 2008/0231129 A1* | 9/2008 | Kubo ............ B24B 41/007 310/90.5 |

FOREIGN PATENT DOCUMENTS

| JP | 2008-229806 A | 10/2008 |
| JP | 2014-096951 A | 5/2014 |

(Continued)

OTHER PUBLICATIONS

Nagashima et al. Translation of JP2014096951A. Published May 2014. Accessed Apr. 2024. (Year: 2014).*

*Primary Examiner* — Walter L Lindsay, Jr.
*Assistant Examiner* — Philip T Fadul
(74) *Attorney, Agent, or Firm* — Stein IP, LLC

(57) ABSTRACT

The present disclosure relates to a vibration damping system and a method for estimating a cutting force of a machine tool using the same, and according to the present disclosure, disclosed is technology including a housing; a stator rotatably positioned at an arbitrary angle in an internal space of the housing; a rotor positioned in a space inside the stator and rotating around an axis of rotation; a spindle rotating with the rotor; a first expander applying an attractive force that pulls the stator when the stator rotates; a second expander applying an attractive force in an opposite direction to the attractive force of the first expander; a first compressor applying a repulsive force that pushes the stator; and a second compressor; to suppress the generation of vibrations of the machine tool, thereby improving machining quality and machining accuracy of a structure.

18 Claims, 15 Drawing Sheets

(58) Field of Classification Search
USPC .......................................................... 73/496
See application file for complete search history.

(56) References Cited

FOREIGN PATENT DOCUMENTS

| | | | |
|---|---|---|---|
| JP | 5921417 | B2 | 4/2016 |
| KR | 10-1209752 | B1 | 12/2012 |
| KR | 10-1397060 | B1 | 5/2014 |
| KR | 10-1471148 | B1 | 12/2014 |

* cited by examiner

VIBRATION DAMPING SYSTEM AND METHOD FOR ESTIMATING CUTTING FORCE OF MACHINE TOOL USING SAME

TECHNICAL FIELD

The present disclosure relates to a vibration damping system which dissipates a repulsive torque of a motor corresponding to a cutting force and a method for estimating a cutting force of a machine tool using the same.

BACKGROUND ART

Vibrations occurring during the use of machine tools may reduce usage efficiency of machines or tools and precision of structures. Vibrations may affect abrasion and damage of tools, abrasion and failure of spindle bearings, poor surface roughness of structures, poor product quality and increased energy consumption.

Further, thermodynamic and dynamic behaviors occurring in spindles due to machining have a direct influence on the accuracy and productivity of structures.

A variety of technologies for reducing vibrations of spindles in machine tools have been presented. Among the technologies for reducing vibrations, a method for passively or actively compensating for a repulsive force is primarily applied at a linear motor motion stage. Recently, state-of-the-art control and on-line vibration monitoring technology are being proposed to reduce vibrations.

It is possible to damp some of the vibrations that occurred in spindles by interaction with structures during machining by changing the machining conditions, but it is impossible to fundamentally reduce the magnitude of the repulsive force and torque generated during machining, so in practice, it is not easily applied to machine tools required to improve the precision and productivity of structures.

RELATED LITERATURES

Patent Literatures

Korean Patent No. 10-1209752

DISCLOSURE

Technical Problem

The present disclosure is designed to solve the above-described problem, and therefore the present disclosure is directed to providing a vibration damping system installed in a machine tool to damp vibrations in the machine tool structure, including a spindle by mechanically dissipating the repulsive torque of a spindle motor occurring during machining of a structure.

Furthermore, the present disclosure is directed to providing a method for estimating a cutting force of a machine tool using the vibration damping system that dissipates a part of the repulsive torque transmitted to the machine tool structure through the spindle, and adjustment is performed based on the estimated cutting force for constant cutting force, thereby improving the machining quality.

Technical Solution

To achieve the above-described object, a vibration damping system according to an embodiment of the present disclosure includes a housing, a stator rotatably positioned at an arbitrary angle in an internal space of the housing, and having a space inside, a rotor of which at least a part is positioned in the space inside the stator, having an axis of rotation at a center, the axis of rotation matching a center of rotation of the stator, and rotating around the axis of rotation by an electromagnetic force, a tool mounted on an end of the axis of rotation of the rotor, and rotating with the rotor to cut a part of a structure, a first expander having a front end connected to an outer surface of the stator and a rear end connected to the housing and applying an attractive force that pulls the stator when the stator rotates, a second expander having a front end connected to the outer surface of the stator and a rear end connected to the housing, positioned at a location symmetric to the location of the first expander with respect to the axis of rotation, and applying an attractive force that pulls the stator in an opposite direction to the attractive force by the first expander when the stator rotates, a first compressor having a front end connected to the outer surface of the stator and a rear end connected to the housing and applying a repulsive force that pushes the stator using an elastic force of a spring, and a second compressor having a front end connected to the outer surface of the stator and a rear end connected to the housing, positioned at a location symmetric to the location of the first compressor with respect to the axis of rotation, and applying a repulsive force that pushes the stator using an elastic force of a spring.

Here, the vibration damping system may further include a controller to calculate a cutting force based on vibration of the stator or rotational motion of the spindle, and control the first compressor or the second compressor.

Here, a strength of the repulsive force that pushes the stator or compressive displacement of the first compressor may be adjusted by the control of the controller.

Here, a strength of the repulsive force that pushes the stator or compressive displacement of the second compressor may be adjusted by the control of the controller.

Here, the controller may include an output module to output rotation information of the spindle in a form of an image or a video, a sensor module disposed in the housing to detect movement of the rotor or the stator and a control module to control the first compressor or the second compressor.

The cutting force of the spindle may be adjusted to keep it constant by adjusting the compressive force or compressive displacement of the compressor based on the estimated cutting force.

To achieve the above-described object, a vibration damping system according to another embodiment of the present disclosure includes a housing, a stator rotatably positioned at an arbitrary angle in an internal space of the housing, and having a space inside, a rotor of which at least a part is positioned in the space inside the stator, having an axis of rotation at a center, the axis of rotation matching a center of rotation of the stator, and rotating around the axis of rotation by an electromagnetic force, a tool mounted on an end of the axis of rotation of the rotor, and rotating with the rotor to cut a part of a structure, a first expander having a front end connected to an outer surface of the stator and a rear end connected to a base of the housing, positioned such that an imaginary lengthwise central axis is parallel to the axis of rotation of the rotor, and applying an attractive force that pulls the stator to give positive rotation stiffness of the stator when the stator rotates, a second expander having a front end connected to the outer surface of the stator and a rear end connected to the base of the housing at a location symmetric to the location of the first expander with respect to the axis of rotation, positioned such that an imaginary lengthwise central axis is parallel to the axis of rotation of the rotor, and applying an attractive force that pulls the stator to give positive rotation stiffness of the stator when the stator rotates, a first compressor having a front end connected to the outer surface of the stator and a rear end connected to the base of the housing, positioned such that an imaginary lengthwise central axis is parallel to the axis of rotation of the rotor, and applying a repulsive force that pushes the stator using an elastic force of a spring, and a second compressor having a front end connected to the outer surface of the stator and a rear end connected to the base of the housing, positioned at a location symmetric to the location of the first compressor with respect to the axis of rotation, and applying a repulsive force that pushes the stator using an elastic force of a spring.

Here, the vibration damping system may further include a controller to calculate a cutting force based on vibration of the stator or rotational motion of the spindle, and control the first compressor or the second compressor.

Here, a strength of the repulsive force that pushes the stator or compressive displacement of the first compressor may be adjusted by the control of the controller.

Here, a strength of the repulsive force that pushes the stator or compressive displacement of the second compressor may be adjusted by the control of the controller.

Here, the controller may include the output module to output rotation information of the spindle in a form of an image or a video, a sensor module disposed in the housing to detect movement of the rotor or the stator and a control module to control the first compressor or the second compressor.

The cutting force of the spindle may be calibrated to keep it constant by adjusting the compressive force or compressive displacement of the compressor based on the estimated cutting force.

To achieve the above-described object, a vibration damping system according to still another embodiment of the present disclosure includes a housing, a stator rotatably positioned at an arbitrary angle in an internal space of the housing, and having a space inside, a rotor of which at least a part is positioned in the space inside the stator, having an axis of rotation at a center, the axis of rotation matching a center of rotation of the stator, and rotating around the axis of rotation by an electromagnetic force, a tool mounted on an end of the axis of rotation of the rotor, and rotating with the rotor to cut a part of a structure, an expander positioned between a base on the other side of the rotor at which the spindle is disposed at one end and the stator, one side connected to the stator and the other side connected to the base, and applying an attractive force that pulls the stator in a direction opposite to a direction in which the stator rotates at the arbitrary angle, a first compressor having a front end connected to an outer surface of the stator and a rear end connected to the housing and applying a repulsive force that pushes the stator using an elastic force of a spring, and a second compressor having a front end connected to the outer surface of the stator and a rear end connected to the housing, positioned at a location symmetric to the location of the first compressor with respect to the axis of rotation, and applying a repulsive force that pushes the stator using an elastic force of a spring.

Here, the vibration damping system may further include a controller to calculate a cutting force based on vibration of the stator or rotational motion of the spindle, and control the first compressor or the second compressor.

Here, a strength of the repulsive force that pushes the stator or compressive displacement of the first compressor may be adjusted by the control of the controller.

Here, a strength of the repulsive force that pushes the stator or compressive displacement of the second compressor may be adjusted by the control of the controller.

Here, the controller may include an output module to output rotation information of the spindle in a form of an image or a video, a sensor module disposed in the housing to detect movement of the rotor or the stator and a control module to control the first compressor or the second compressor.

The cutting force of the spindle may be calibrated to keep it constant by adjusting the compressive force or compressive displacement of the compressor based on the estimated cutting force.

To achieve the above-described object, a method for estimating a cutting force of a machine tool using a vibration damping system according to an embodiment of the present disclosure includes an initial compression amount determination step of compressing the spring of each of the first compressor and the second compressor of the vibration damping system according to the present disclosure to an initial value, a spindle rotation amount determination step of measuring a cutting force frequency and an angle change of the stator by supplying an electric current to the stator of the vibration damping system to rotate the spindle after the spring of the first compressor and the second compressor is compressed to the initial value in the initial compression amount determination step, a spindle cutting force calculation step of calculating an average cutting force based on the cutting force frequency and the angle change of the stator measured in the spindle rotation amount determination step, and a spindle cutting force calibration step of calibrating the cutting force of the spindle based on the average cutting force calculated in the spindle cutting force calculation step.

The cutting force of the spindle may be calibrated to keep it constant by adjusting the compressive force or compressive displacement of the compressor based on the estimated cutting force.

Here, calculating, by the controller, the cutting force based on the machining force generated by interaction between the spindle and the structure may include calculating an average cutting force of the spindle based on at least one of the rotational speed of the spindle, the number of blades of the spindle or the angle of the stator, and turning the calculated average cutting force into data and outputting the data.

Advantageous Effects

The vibration damping system, according to the present disclosure may provide an environment for easy machining by estimating the average cutting force of the spindle through the rotational speed of the spindle, the number of blades formed in the spindle or the angular displacement of the stator, and setting the amount of compression of the compressor based on the estimated average cutting force.

Additionally, according to the method for estimating a cutting force of a machine tool according to the present disclosure, it is possible to damp vibrations of the machine tool by preventing the repulsive torque generated in real-time by an interaction between the spindle and the structure from being transmitted to the machine tool structure through the machine tool spindle. Through this, it is possible to improve the machining accuracy and productivity of the structure produced by the machine tool, including the vibration damping system.

Additionally, it is possible to improve the machining accuracy of the structure by estimating the cutting force of the machine tool and adjusting the compressive force or compressive displacement of the compressor using the estimated cutting force to keep the cutting force constant during machining.

BEST MODE

Figure 1:
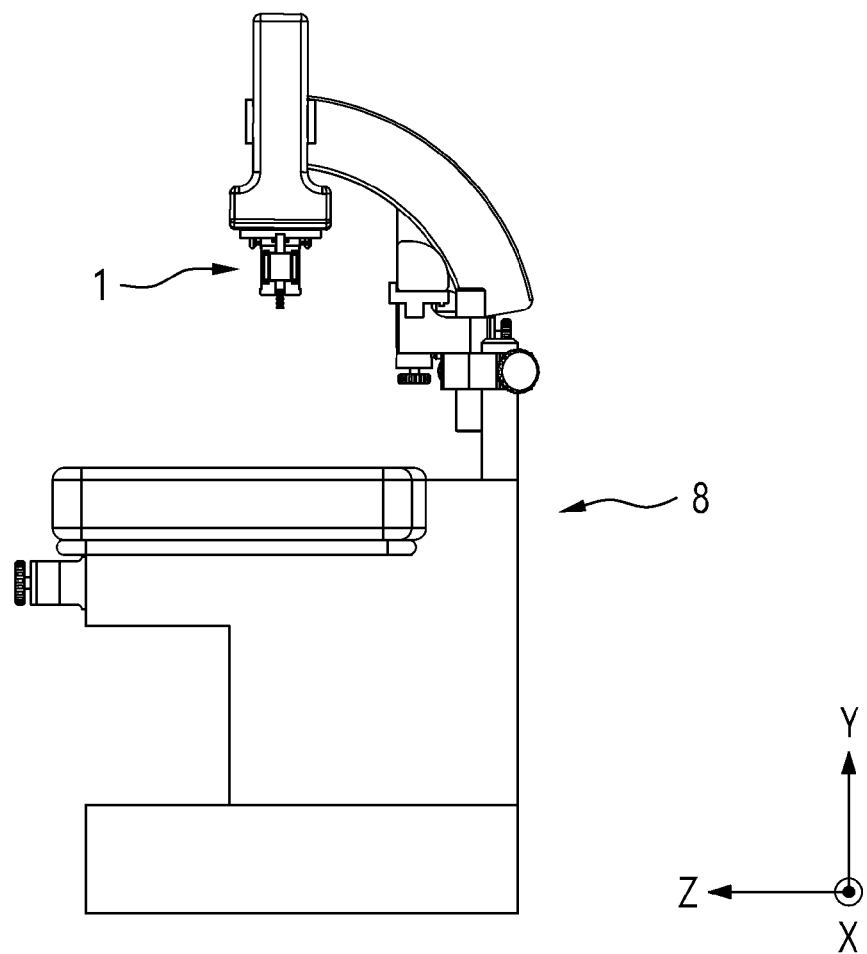
FIG. 1 is a diagram schematically showing a machine tool to which a vibration damping system according to an embodiment of the present disclosure may be applied.

Hereinafter, the preferred embodiments will be described with reference to the accompanying drawings for a full and thorough understanding of the present disclosure.

The present disclosure may have a variety of modifications and include many embodiments, and particular embodiments are shown in the drawings and described in detail. However, this is not intended to limit the present disclosure to the particular embodiments, and should be understood as including all modifications, equivalents or substitutes within the spirit and scope of the present disclosure.

The terms "first," "second," and the like may be used to describe various elements, but the elements should not be limited by the terms. These terms are used to distinguish one element from another. For example, a first element may be referred to as a second element, and likewise, a second element may be referred to as a first element without departing from the scope of protection of the present disclosure. The term "and/or" includes a combination of items related to the plural form or any of the items.

It will be understood that when an element is referred to as being "connected to" or "coupled to" another element, it can be directly connected or coupled to the other element, but intervening elements may be present between them. In contrast, it will be understood that when an element is referred to as being "directly connected to" or "directly coupled to" another element, there are no intervening elements between them.

The terminology used herein is for the purpose of describing particular embodiments only and is not intended to be limiting of the present disclosure. As used herein, the singular forms include the plural forms as well, unless the context clearly indicates otherwise. The term "comprises" or "includes" when used in this specification, specifies the presence of stated features, integers, steps, operations, elements, components or a combination thereof, but does not preclude the presence or addition of one or more other features, integers, steps, operations, elements, components or a combination thereof.

Unless otherwise defined, all terms, including technical and scientific terms used herein, have the same meaning as commonly understood by those skilled in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Hereinafter, the preferred embodiments of the present disclosure will be described in more detail with reference to the accompanying drawings. In describing the present disclosure, like reference signs are used for like elements in the drawings to ease the understanding of the present disclosure and overlapping descriptions of like elements are omitted herein.

Figure 2:
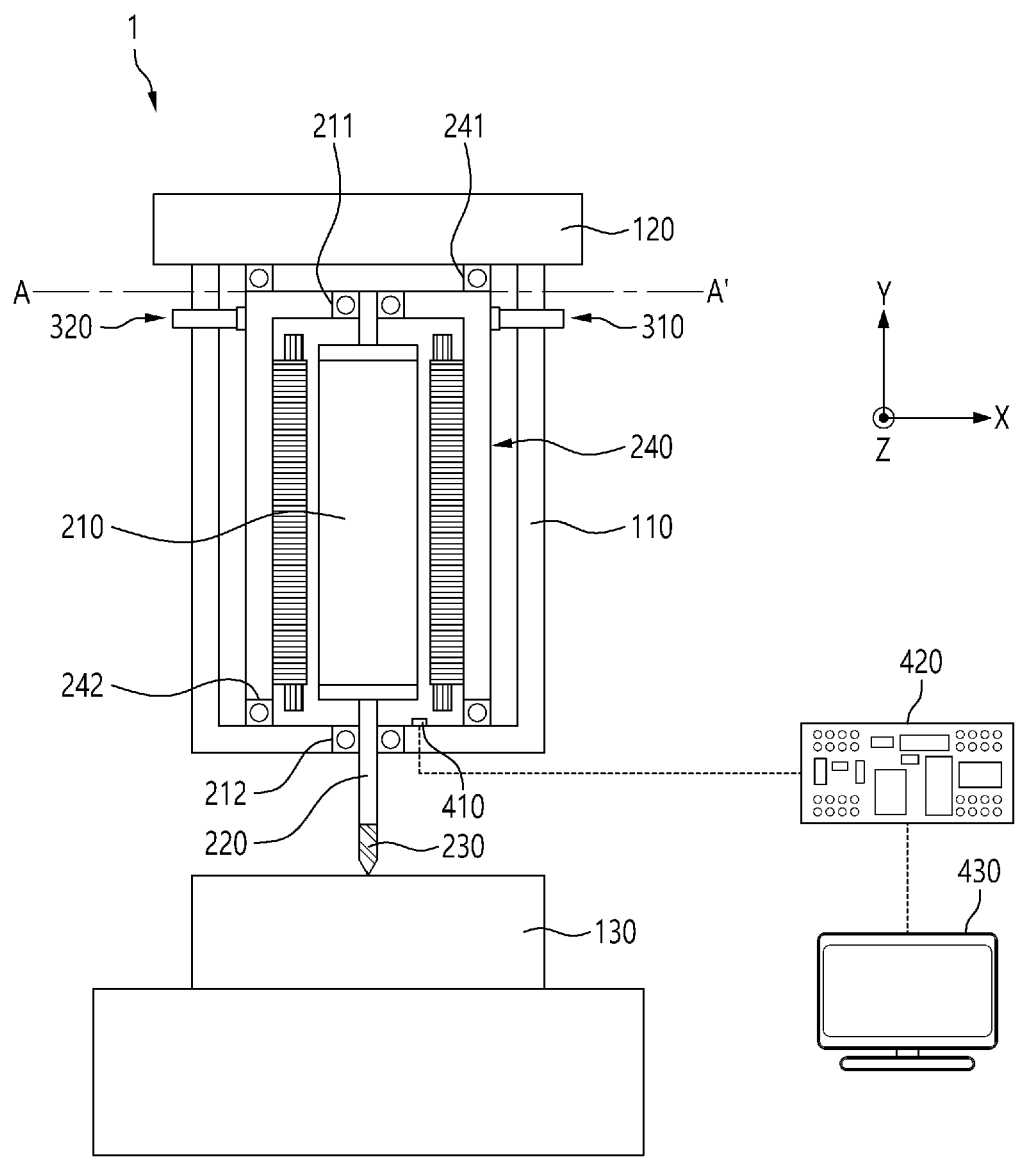
FIG. 2 is a diagram schematically showing a vibration damping system according to an embodiment of the present disclosure.

FIG. 1 is a diagram schematically showing a milling machine as a machine tool to which a vibration damping system according to an embodiment of the present disclosure may be applied, and FIG. 2 is a diagram schematically showing the vibration damping system according to an embodiment of the present disclosure. Additionally, FIG. 3 is a top cross-sectional view schematically showing a stator and a housing of the vibration damping system according to an embodiment of the present disclosure.

The vibration damping system 1, according to an embodiment of the present disclosure as shown in FIG. 2, may be applied on the milling machine 8 as referenced in FIG. 1, to damp vibrations occurring in the spindle of the main axis.

Figure 3:
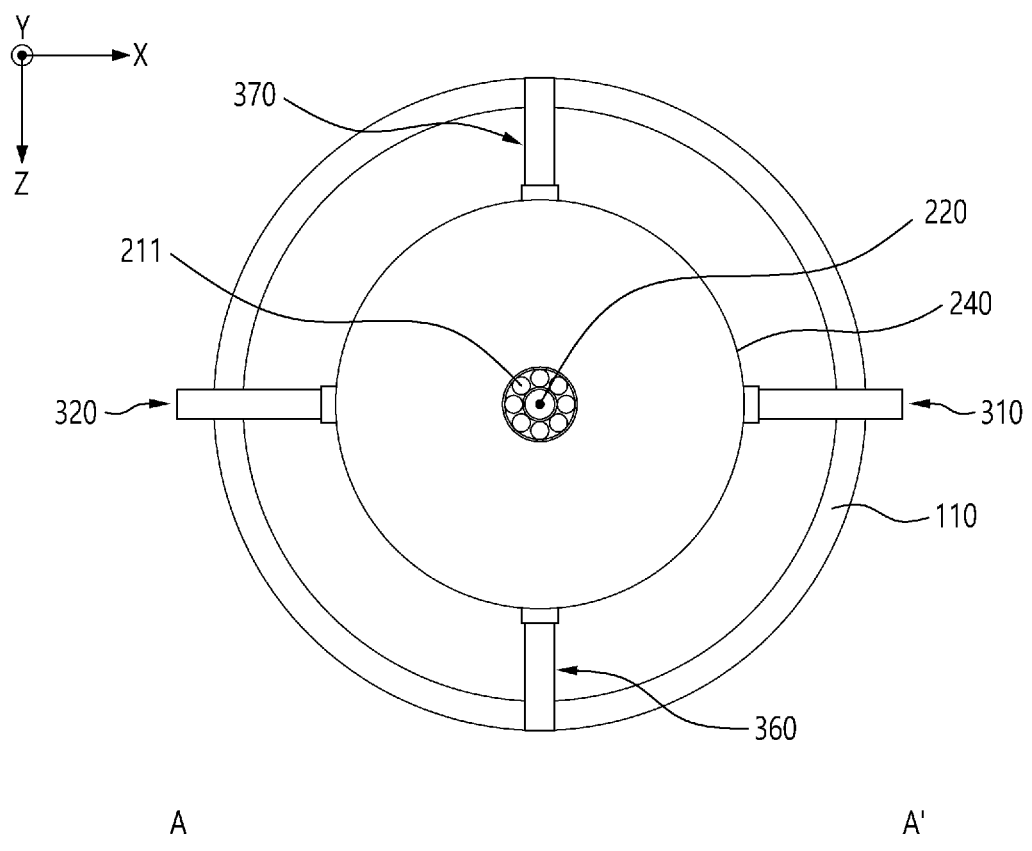
FIG. 3 is a top cross-sectional view schematically showing a stator and a housing of a vibration damping system according to an embodiment of the present disclosure.

As referenced in FIGS. 2 and 3, the vibration damping system 1, according to an embodiment of the present disclosure, includes a housing 110, a stator 240, a rotor 210, a spindle 230, a first expander 360, a second expander 370, a first compressor 310 and a second compressor 320, and may further include a controller. Here, the controller includes a sensor module 410, a control module 420, and an output module 430.

The housing 110 has a space inside where the rotor 210 and the stator 240 may be received. A base 120 is on top of the housing 110. The base 120 is a part of the machine tool and may be the background for supporting the housing 110 supported on the base 120, and the stator 240, the rotor 210, and the spindle 230 as shown in the drawings.

Additionally, the housing 110 may perform a function of protecting the stator 240 and the rotor 210 received therein.

The stator 240 is positioned in the housing 110, as referenced in the drawing. The stator 240 is rotatably positioned at an arbitrary angle in the internal space of the housing 110, and has a space inside. Preferably, stator bearings 241, 242 are provided between the housing 110 and the stator 240 to allow the stator 240 to rotate at an arbitrary angle.

The stator bearings 241, 242 assist the rotation of the stator 240. The center of rotation around which the stator 240 rotates at an arbitrary angle may match an axis of rotation 220 of the rotor 210.

Additionally, at least a part of the rotor 210 is positioned in the space inside the stator 240. Additionally, the rotor 210 has the axis of rotation 220 that matches the center of rotation of the stator 240 at the center, and rotates around the axis of rotation by the electromagnetic force.

Preferably, rotor bearings 211, 212 are provided between the rotor 210 and the stator 240 for stable rotation of the rotor 210.

When the alternating current is transmitted to the stator 240 by the control of the control module 420 of the controller, the rotor 210 makes a rotational motion around the axis of rotation 220 by an induced electromotive force.

A tool 230 that rotates in direct contact with a structure 130 to enable a cutting process is mounted on the end of the axis of rotation 220 of the rotor 210. The tool 230 mounted on the axis of rotation 220 of the rotor 210 rotates with the rotating rotor 210 to cut a part of the structure 130.

As referenced in FIG. 3, the first expander 360, the second expander 370, the first compressor 310, and the second compressor 320 are positioned between the housing 110 and the stator 240.

The first expander, the second expander, the first compressor, and the second compressor will be described with further reference to FIGS. 4 to 6.

Figure 4:
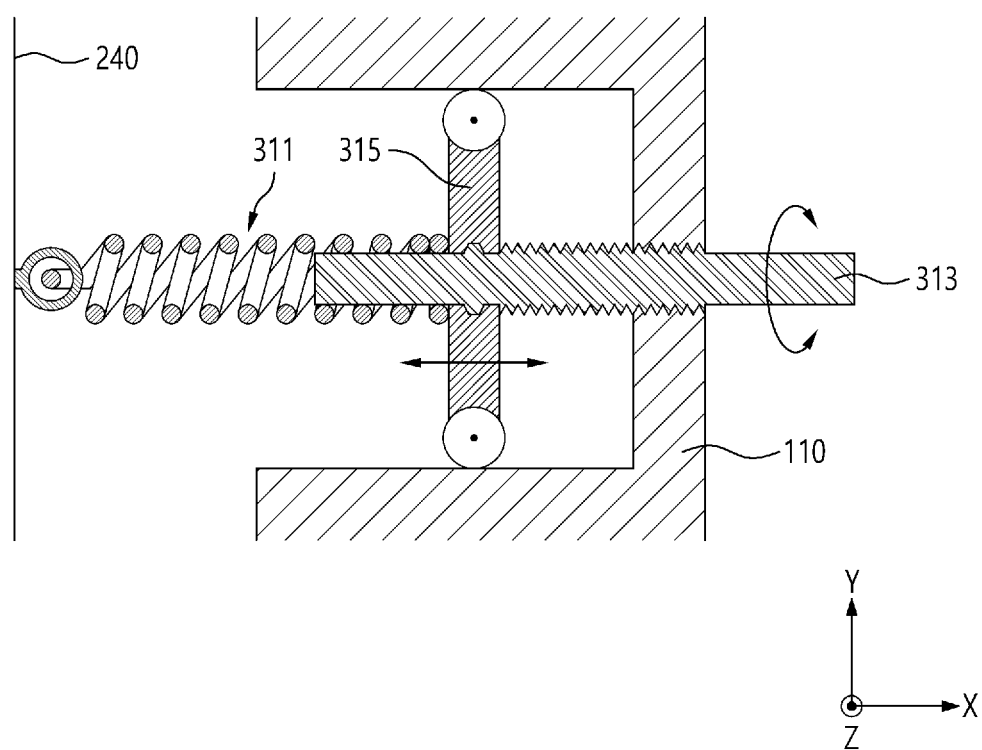
FIG. 4 is a cross-sectional view schematically showing a first compressor of a vibration damping system according to an embodiment of the present disclosure.
Figure 5:
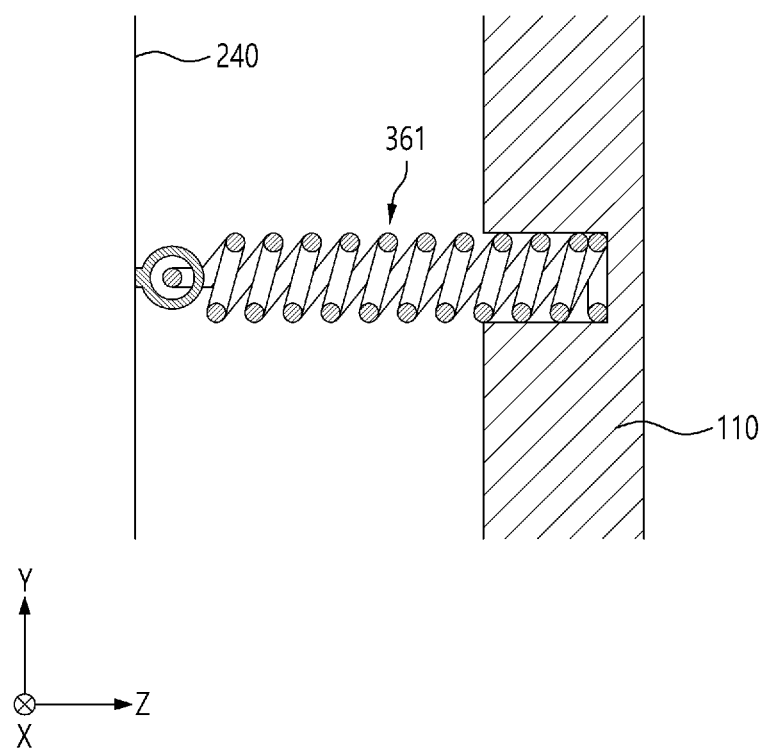
FIG. 5 is a cross-sectional view schematically showing a first expander of a vibration damping system according to an embodiment of the present disclosure.
Figure 6:
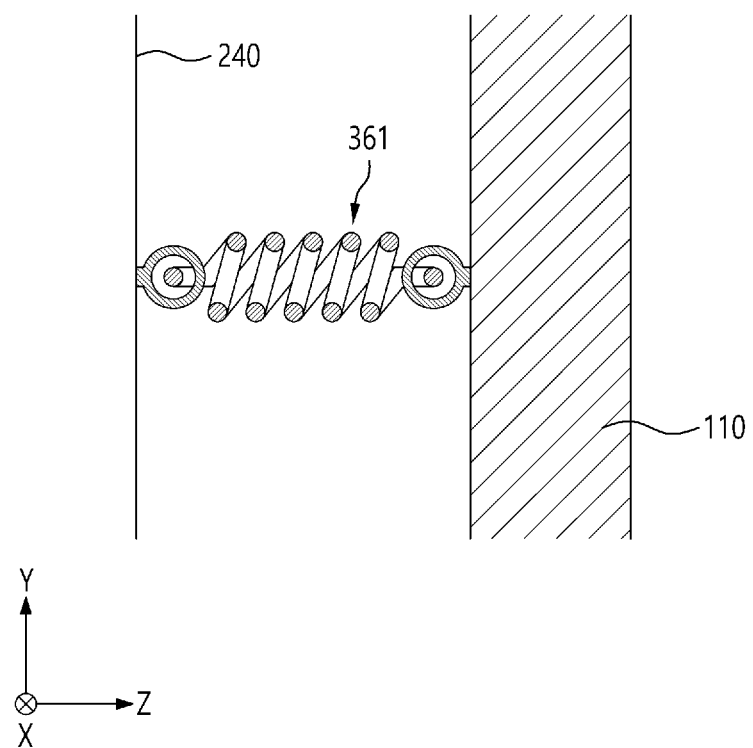
FIG. 6 is a cross-sectional view schematically showing another form of a first expander in a vibration damping system according to an embodiment of the present disclosure.

FIG. 4 is a cross-sectional view schematically showing the first compressor of the vibration damping system according to an embodiment of the present disclosure, FIG. 5 is a cross-sectional view schematically showing the first expander of the vibration damping system according to an embodiment of the present disclosure, and FIG. 6 is a cross-sectional view schematically showing another form of the first expander in the vibration damping system according to an embodiment of the present disclosure.

The first compressor 310 has the front end connected to the outer surface of the stator 240 and the rear end connected to the housing 110, and applies a repulsive force that pushes the stator 240 using the elastic force of a spring.

Preferably, the first compressor 310 may adjust the strength of the repulsive force that pushes the stator 240 by adjusting the extent of compression of the spring included in the first compressor 310.

The first compressor 310 may have a shape as referenced in FIG. 4. That is, the first compressor 310 may include a compression spring 311, a compression strut 315, and a compression adjuster 313.

The front end of the compression spring 311 is connected to the outer surface of the stator 240. Additionally, the rear end of the compression spring 311 is in contact with and connected to the compression strut 315, as shown in FIG. 4. The compression strut 315 presses down to compress the rear end of the compression spring 311. The compression strut 315 is connected to the compression adjuster 313. As referenced in the drawing, the compression adjuster 313 has threads on the outer periphery of at least a part of the compression adjuster 313, and is connected to the housing 110 by bolting. Accordingly, the compression adjuster 313 moves forward or rearward by the rotation of the compression adjuster 313.

When the compression adjuster 313 moves forward by rotation, the compression strut 315 connected to the compression adjuster 313 moves forward. Here, the compression strut 315 may include a wheel for smooth movements.

When the compression strut 315 is moved forward by the compression adjuster 313, the compression strut 315 compresses the compression spring 311. The compressed compression spring 311 applies a force that pushes the stator 240.

On the contrary, when the compression strut 315 is moved rearward using the compression adjuster 313, the extent to which the compression spring 311 is compressed is reduced. The compression spring 311 having the reduced extent of compression reduces in the strength of the force that pushes the stator 240.

As described above, it is possible to adjust the magnitude of the force that pushes the stator 240 by the first compressor 310, including the compression adjuster 313, the compression strut 315, and the compression spring 311.

Alternatively, the control module 420 of the controller, as described below may control the force that pushes the stator 240 by the compression spring by rotating the compression adjuster 313.

Additionally, the second compressor 320 has the front end connected to the outer surface of the stator 240 and the rear end connected to the housing 110. Additionally, the second compressor 320 is positioned at a location symmetric to the location of the first compressor 310 with respect to the axis of rotation 220, and applies a repulsive force that pushes the stator 240 using the elastic force of a spring.

The second compressor 320 is basically the same as the above-described first compressor 310, and the previous description may be used instead.

In this instance, the second compressor 320 and the first compressor 310 are preferably positioned at symmetrical locations to each other with respect to the axis of rotation 220. Here, the directions of the push forces of the first compressor 310 and the second compressor 320 are opposite directions, i.e., directions facing each other.

The first expander 360 has the front end connected to the outer surface of the stator 240 and the rear end connected to the housing 110. The first expander 360 applies an attractive force that pulls the stator 240 when the stator 240 rotates. As the first expander 360, a tension spring 361 as shown in FIG. 5 or 6 may be provided.

When the stator 240 rotates at an arbitrary angle, the length of the tension spring 361 is extended, and a pulling force from one side to the other side is exerted by elastic recovery.

The second expander 370 has the front end connected to the outer surface of the stator 240 and the rear end connected to the housing 110. Here, the second expander 370 is positioned at a location symmetric to the location of the first expander 360 with respect to the axis of rotation 220.

When the stator 240 rotates, the second expander 370 positioned as described above applies an attractive force that pulls the stator 240 in the opposite direction to the attractive force of by the first expander 360.

The second expander 370 has the same structure as the first expander 360. That is, the tension spring 361, which is the first expander 360 as referenced in FIG. 5, may be equally applied to the second expander 370.

The first expander 360 and the second expander 370 are preferably positioned at symmetrical locations to each other with respect to the axis of rotation 220. Here, the directions of the pull forces of the first expander 360 and the second expander 370 are opposite directions.

The first expander 360 and the second expander 370 are placed and positioned on the same line with respect to the axis of rotation 220 of the rotor 210, and the first compressor 310 and the second compressor 320 are placed and positioned on the same line. Here, the first compressor 310 and the second compressor 320 apply push forces in directions facing each other, and the first expander 360 and the second expander 370 apply pull forces in the opposite directions.

With the first compressor 310, the second compressor 320, the first expander 360, and the second expander 370, the push force and the pull force act on the stator 240 that rotates around the axis of rotation 220 at an arbitrary angle, thereby suppressing the generation of vibrations by the rotation of the stator 240.

The compression spring 311 of the first compressor 310 and the second compressor 320 initially compressed at a predetermined level gives negative rotation stiffness of the stator 240.

Further, when the stator 240 rotates around the axis of rotation 220 at an arbitrary angle, a positive rotation stiffness of the stator 240 is given by the first expander 360 and the second expander 370.

A part of the repulsive torque during machining transmitted to the machine tool structure is dissipated by the first compressor 310, the second compressor 320, the first expander 360, and the second expander 370 that are positioned and apply the forces as described above, thereby damping vibrations of the machine tool.

The controller calculates the cutting force based on the vibration of the stator 240 or the rotational motion of the spindle 230, and controls the first compressor 310 or the second compressor 320. The controller includes the output module 430, the sensor module 410, and the control module 420.

The output module 430 outputs rotation information of the spindle 230 in the form of an image or a video.

The sensor module 410 is disposed in the housing 110 and detects the movement of the rotor 210 or the stator 240. A detection signal detected by the sensor module 410 is transmitted to the control module 420.

The control module 420 controls the first compressor 310 or the second compressor 320.

The strength of the repulsive force that pushes the stator 240 or the compressive displacement of the first compressor 310 is adjusted by the control of the controller. That is, the displacement for compression of the spring 311 included in the first compressor 310 or the strength of the repulsive force that pushes the stator 240 is adjusted.

Additionally, the strength of the repulsive force that pushes the stator 240 or the compressive displacement of the second compressor 320 may be adjusted by the control of the controller. That is, the displacement for compression of the spring included in the first compressor 310 or the strength of the repulsive force that pushes the stator 240 is adjusted.

It is possible to damp the vibrations using the tool.

Additionally, the following variation is fully possible.

Subsequently, a variation in which the first compressor 310, the second compressor 320, the first expander 360, and the second expander 370 are positioned in the housing 110 and the base 120 in another form will be described with reference to FIGS. 7 to 11.

Figure 7:
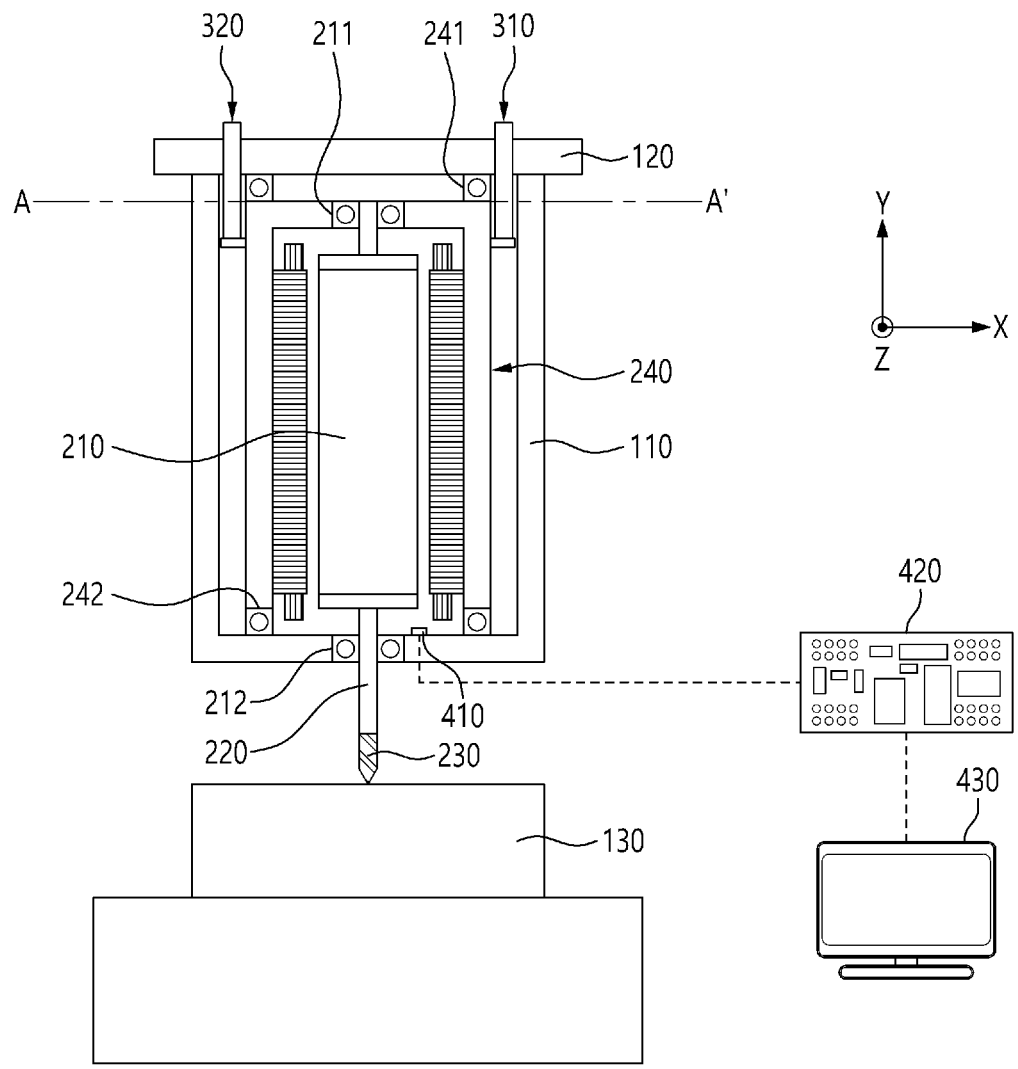
FIG. 7 is a diagram schematically showing a vibration damping system according to another embodiment of the present disclosure.
Figure 8:
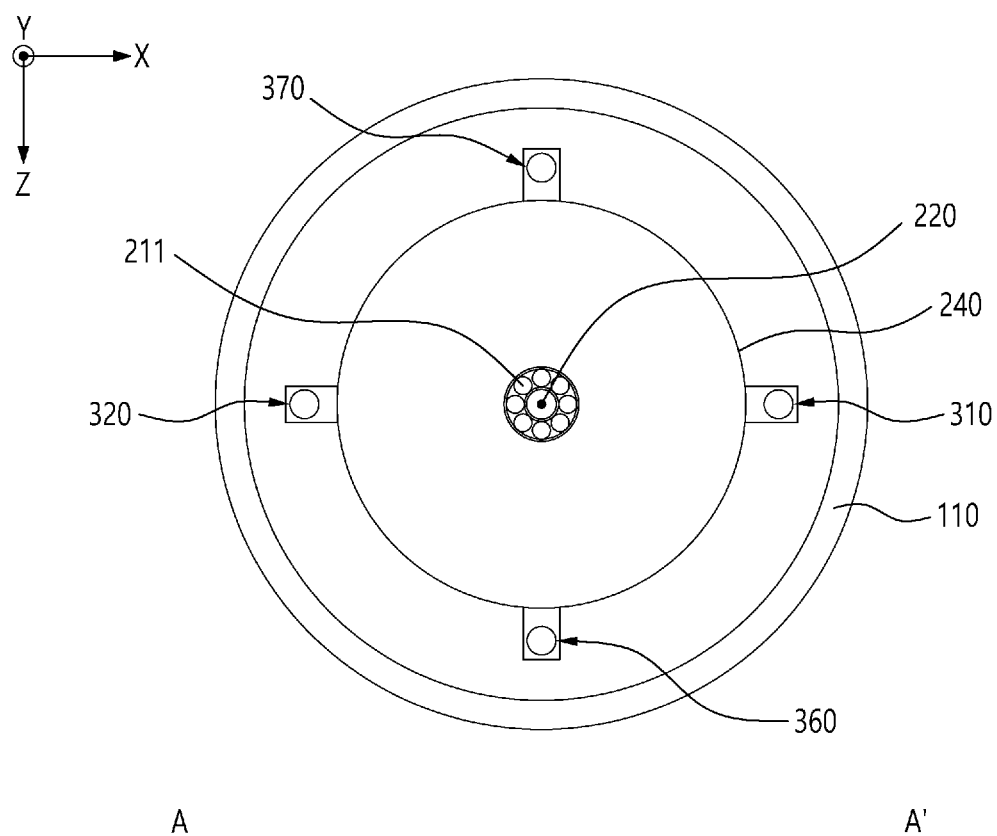
FIG. 8 is a top cross-sectional view schematically showing a stator and a housing of a vibration damping system according to another embodiment of the present disclosure.
Figure 9:
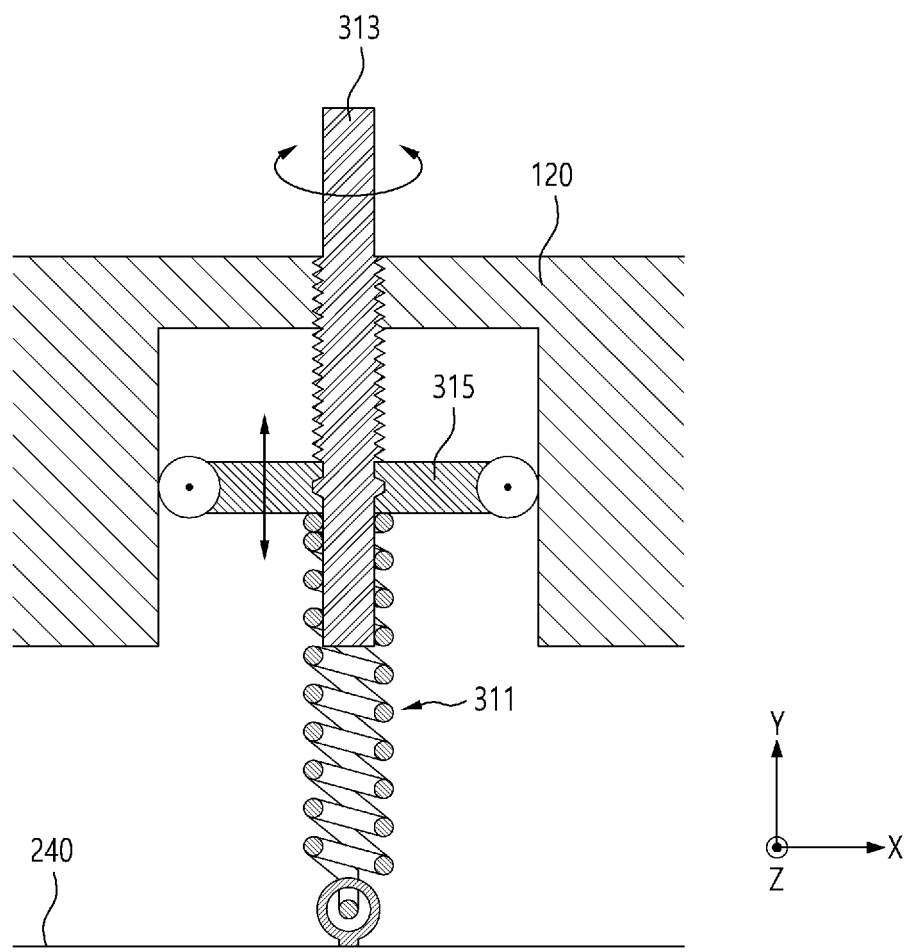
FIG. 9 is a cross-sectional view schematically showing a first compressor of a vibration damping system according to another embodiment of the present disclosure.
Figure 10:
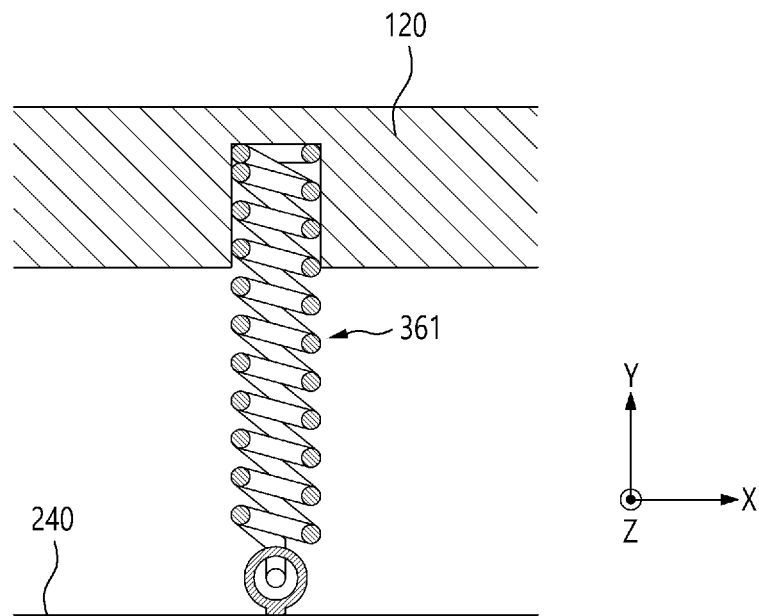
FIG. 10 is a cross-sectional view schematically showing a first expander of a vibration damping system according to another embodiment of the present disclosure.
Figure 11:
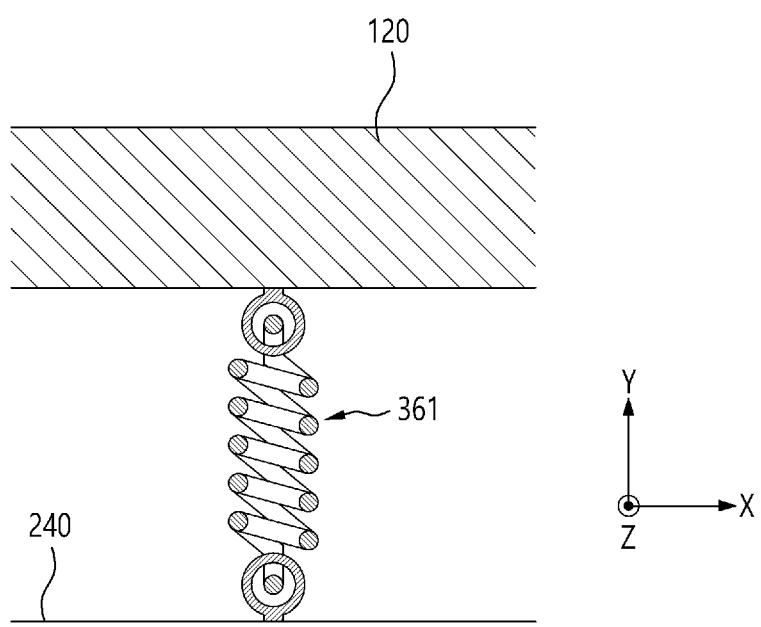
FIG. 11 is a cross-sectional view schematically showing another form of a first expander in a vibration damping system according to another embodiment of the present disclosure.

FIG. 7 is a diagram schematically showing a vibration damping system according to another embodiment of the present disclosure, FIG. 8 is a top cross-sectional view schematically showing a stator and a housing of the vibration damping system according to another embodiment of the present disclosure, FIG. 9 is a cross-sectional view schematically showing a first compressor of the vibration damping system according to another embodiment of the present disclosure, FIG. 10 is a cross-sectional view schematically showing a first expander of the vibration damping system according to another embodiment of the present disclosure, and FIG. 11 is a cross-sectional view schematically showing another form of the first expander in the vibration damping system according to another embodiment of the present disclosure.

Referring to FIGS. 7 to 11, the vibration damping system according to another embodiment of the present disclosure includes a housing 110, a stator 240, a rotor 210, a spindle 230, a first expander 360, a second expander 370, a first compressor 310, and a second compressor 320, and may further include a controller.

Here, the housing 110, the stator 240, the rotor 210, the spindle 230, and the controller are generally the same as those described above, and the previous description is used instead.

The first compressor 310 has the front end connected to the outer surface of the stator 240 and the rear end connected to the base 120 of the housing 110, and is positioned such that an imaginary lengthwise central axis of the first compressor 310 is parallel to the axis of rotation 220 of the rotor 210.

Additionally, a repulsive force that pushes the stator is applied using the elastic force of the spring 311 to give negative rotation stiffness of the stator 240. Preferably, the first compressor 310 may adjust the strength of the repulsive force that pushes the stator 240 by adjusting the extent of compression of the spring included in the first compressor 310.

The first compressor 310 may have a shape as referenced in FIG. 9. That is, the first compressor 310 may include a compression spring 311, a compression strut 315, and a compression adjuster 313.

The front end of the compression spring 311 is connected to the outer surface of the stator 240. For reference, FIG. 9 shows that the front end of the compression spring 311 is positioned facing downward Additionally, the rear end of the compression spring 311 is in contact with and connected to the compression strut 315 as shown in FIG. 9. The compression strut 315 presses down to compress the rear end of the compression spring 311. The compression strut 315 is connected to the compression adjuster 313. As referenced in the drawing, the compression adjuster 313 has threads on the outer periphery of at least a part of the compression adjuster 313, and is connected to the housing 110 by bolting. Accordingly, the compression adjuster 313 moves forward or rearward by the rotation of the compression adjuster 313.

In FIG. 9, the forward movement of the compression adjuster 313 is a downward movement, and the rearward movement of the compression adjuster 313 is an upward movement.

When the compression adjuster 313 moves forward by rotation, the compression strut 315 connected to the compression adjuster 313 moves forward. Here, the compression strut 315 may include a wheel for smooth movements.

When the compression strut 315 is moved forward by the compression adjuster 313, the compression strut 315 compresses the compression spring 311. The compressed compression spring 311 applies a force that pushes the stator 240.

On the contrary, when the compression strut 315 is moved rearward using the compression adjuster 313, the extent to which the compression spring 311 is compressed is reduced. The compression spring 311 having the reduced extent of compression reduces in the strength of the force that pushes the stator 240.

As described above, it is possible to adjust the magnitude of the force that pushes the stator 240 by the first compressor 310 including the compression adjuster 313, the compression strut 315 and the compression spring 311.

Additionally, the control module 420 of the controller controls the magnitude of the force that pushes the stator 240 by the compression spring by rotating the compression adjuster 313.

The second compressor 320 has the front end connected to the outer surface of the stator 240, and the rear end connected to the base 120 of the housing 110, is positioned at a location symmetric to the location of the first compressor 310 with respect to the axis of rotation 220, and applies a repulsive force that pushes the stator 240 using the elastic force of the spring to give negative rotation stiffness of the stator 240.

The second compressor 320 is basically the same as the above-described first compressor 310, and the previous description may be used instead.

In this instance, the second compressor 320 and the first compressor 310 are preferably positioned at symmetrical locations to each other with respect to the axis of rotation 220. Here, the directions of the push forces of the first compressor 310 and the second compressor 320 are the same direction, parallel to the lengthwise direction of the axis of rotation 220.

The first expander 360 has the front end connected to the outer surface of the stator 240 and the rear end connected to the base 120 of the housing 110, and is positioned such that an imaginary lengthwise central axis of the first expander 360 is parallel to the axis of rotation 220 of the rotor 210.

Additionally, when the stator 240 rotates, the first expander 360 applies an attractive force that pulls the stator 240 to give positive rotation stiffness of the stator 240.

As the first expander 360, a tension spring 361 as shown in FIG. 10 may be provided.

When the stator 240 rotates at an arbitrary angle, the length of the tension spring 361 is extended, and a pulling force from one side to the other side is exerted by elastic recovery.

The second expander 370 has the front end connected to the outer surface of the stator 240 and the rear end connected to the base 120 of the housing 110 at a location symmetric to the location of the first expander 360 with respect to the axis of rotation 220, and is positioned such that an imaginary lengthwise central axis is parallel to the axis of rotation 220 of the rotor 210.

Additionally, when the stator 240 rotates, the second expander 370 applies an attractive force that pulls the stator 240 to give positive rotation stiffness of the stator 240.

The second expander 370 has the same structure as the first expander 360. That is, the tension spring 361, which is the first expander 360 as referenced in FIG. 10, may be equally applied to the second expander 370.

The first expander 360 and the second expander 370 are preferably positioned at symmetrical locations to each other with respect to the axis of rotation 220. Here, the directions of the pull forces of the first expander 360 and the second expander 370 are in the same direction, parallel to the axis of rotation 220. However, the direction of pull by the first expander 360 and the second expander 370 is opposite to the direction of a push by the first compressor 310 and the second compressor 320.

The first expander 360 and the second expander 370 are placed and positioned on the same line with respect to the axis of rotation 220 of the rotor 210, and the first compressor 310 and the second compressor 320 are placed and positioned on the same line.

Here, the first compressor 310 and the second compressor 320 apply push forces in directions that are parallel to the axis of rotation 220 but the same as each other, and the first expander 360 and the second expander 370 apply pull forces in directions that are parallel to the axis of rotation 220 but opposite to each other.

With the first compressor 310, the second compressor 320, the first expander 360, and the second expander 370, the push force and the pull force act on the stator 240 that rotates around the axis of rotation 220 at an arbitrary angle, thereby suppressing the torque transmitted to the housing by the rotation of the stator 240.

The compression spring 311 of the first compressor 310 and the second compressor 320 initially compressed at a predetermined level gives negative rotation stiffness of the stator 240.

Further, when the stator 240 rotates around the axis of rotation 220 at an arbitrary angle, the positive rotation stiffness of the stator 240 is given by the first expander 360 and the second expander 370.

The repulsive torque transmitted to the housing is dissipated by the first compressor 310, the second compressor 320, the first expander 360, and the second expander 370 that are positioned and apply the forces as described above.

Meanwhile, another variant as described below is fully possible, and will be described with further reference to FIGS. 12 and 13.

Figure 12:
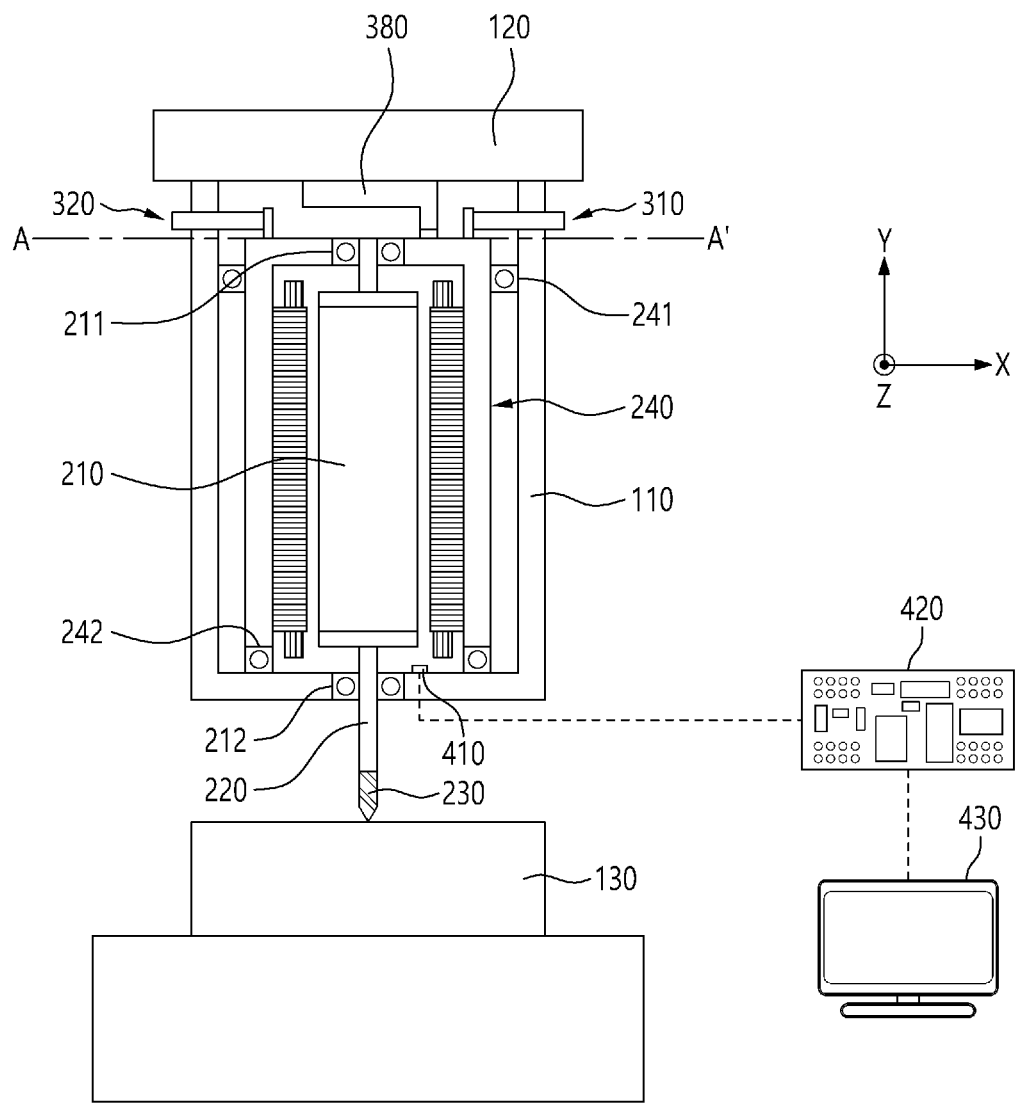
FIG. 12 is a diagram schematically showing a vibration damping system according to a variant embodiment of the present disclosure.
Figure 13:
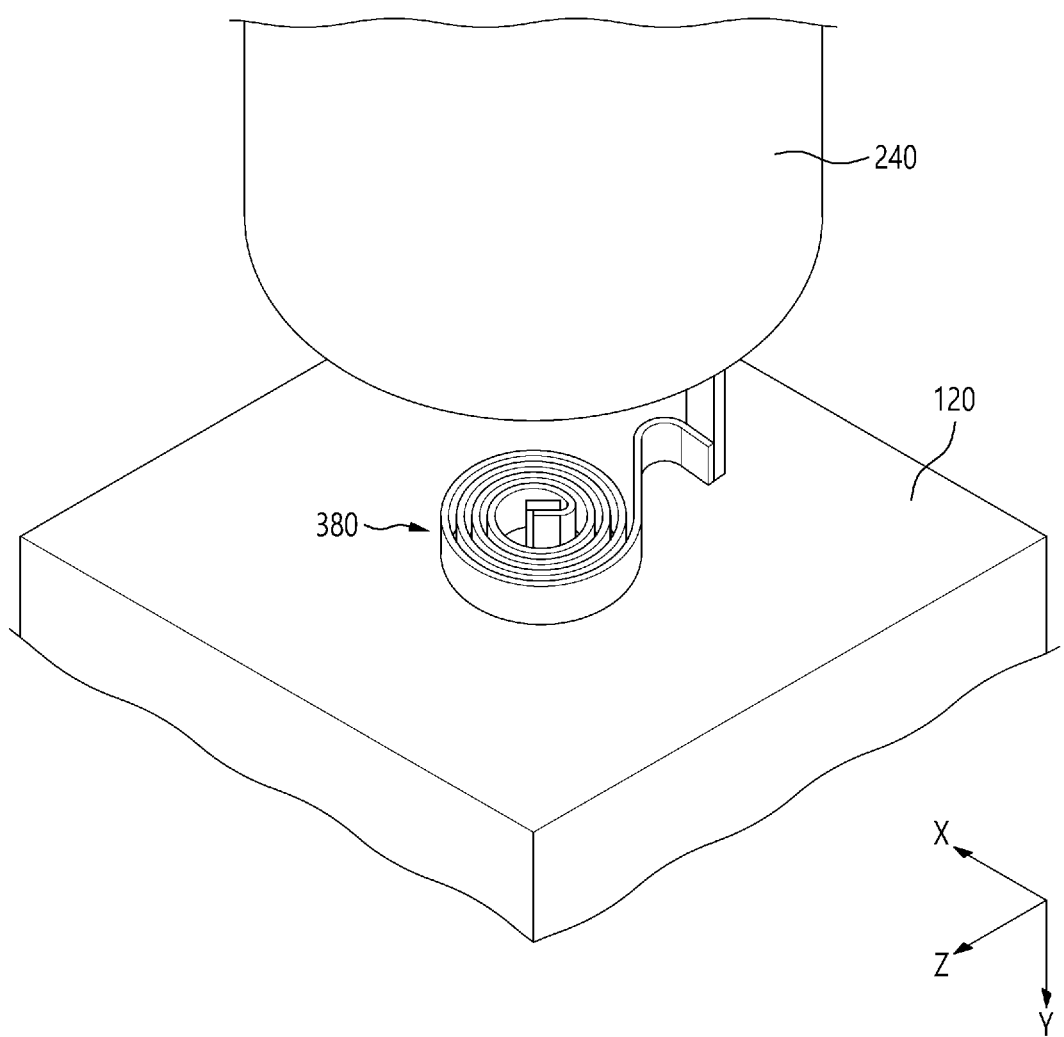
FIG. 13 is a diagram schematically showing an expander of a vibration damping system according to a variant embodiment of the present disclosure.

FIG. 12 is a diagram schematically showing a vibration damping system according to a variant embodiment of the present disclosure, and FIG. 13 is a diagram schematically showing an expander of the vibration damping system according to a variant embodiment of the present disclosure.

The vibration damping system, according to another embodiment of the present disclosure, includes a housing 110, a stator 240, a rotor 210, a spindle 230, an expander 380, a first compressor 310, and a second compressor 320, and may further include a controller. Here, the controller includes a sensor module 410, a control module 420, and an output module 430.

Here, the housing 110, the stator 240, the rotor 210, the spindle 230 and the controller are the same as those described above, and the previous description is used instead.

The first compressor 310 has the front end connected to the outer surface of the stator 240 and the rear end connected to the housing 110, and applies a repulsive force that pushes the stator 240 using the elastic force of a spring.

The first compressor 310 is similar to the description made above with reference to FIG. 4, and the previous description is used instead.

The second compressor 320 has the front end connected to the outer surface of the stator 240 and the rear end connected to the housing 110, and is positioned at a location symmetric to the location of the first compressor 310 with respect to the axis of rotation 220, and applies a repulsive force that pushes the stator using the elastic force of a spring. The second compressor 320 is similar to the first compressor 310 described above with reference to FIG. 4, and the previous description is used instead.

The expander 380 is positioned between the base 120 on the other side of the rotor 210 at which the spindle 230 is disposed at one end and the stator 240, has one side connected to the stator 240 and the other side connected to the base 120, and applies an attractive force that pulls the stator 240 in a direction opposite to the direction in which the stator 240 rotates at an arbitrary angle.

As the expander 380, a spiral torsion spring as shown in FIG. 13 may be used.

When the stator 240 rotates at an arbitrary angle, the shape of the spiral torsion spring 380, which is the expander, is deformed and a pull force is exerted in a direction opposite to the direction in which the stator 240 rotates by elastic recovery of the spiral torsion spring 380.

The embodiment in which the spiral torsion spring 380 is used as the expander as described above is fully possible.

With the first compressor 310, the second compressor 320, and the spiral torsion spring 380, the push force and the pull force act on the stator 240 that rotates around the axis of rotation 220 at an arbitrary angle, thereby suppressing the generation of vibrations by the rotation of the stator 240.

The compression spring 311 of the first compressor 310 and the second compressor 320 initially compressed at a predetermined level gives negative rotation stiffness of the stator 240.

Further, the positive rotation stiffness of the stator 240 is given by the expander 380, i.e., the spiral torsion spring.

Vibrations are damped by the first compressor 310, the second compressor 320 and the expander 380 that are positioned and apply the forces as described above.

Figure 14:
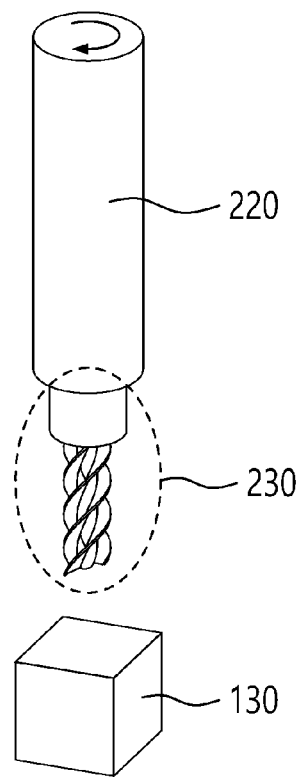
FIG. 14 is a diagram schematically showing an example of cutting a structure by a vibration damping system according to an embodiment of the present disclosure applied to a machine tool.

FIG. 14 is a diagram schematically showing an example of cutting the structure by the vibration damping system according to an embodiment of the present disclosure applied to the machine tool.

As referenced in FIG. 14, for machining of the structure 130 in a fixed state, the tool 230 is rotated by controlling the machine tool. During the machining of the structure 130, the tool 230 and a rotor central axis 220 may have the same direction of rotation and the same rotational speed.

In the machining process for the structure 130, when the tool 230 comes into contact with the structure 130, the cutting of the structure 130 is performed. In this instance, patterns of vibration may occur by repeated collisions between the blades of the spindle 230 and the structure 130.

The controller may control the above-described compressor or expander to adjust the machining force generated during machining or induce behaviors corresponding to the collected patterns.

In addition to the embodiments described above with reference to the drawings, a variety of modifications may be made to the arrangement structure of the first compressor, the second compressor, and the expander. Of course, all structures of the expander that may be modified by the rotational motion of the stator are possible.

Subsequently, a method for estimating a cutting force of a machine tool using the above-described vibration damping system will be described with further reference to FIG. 15.

Figure 15:
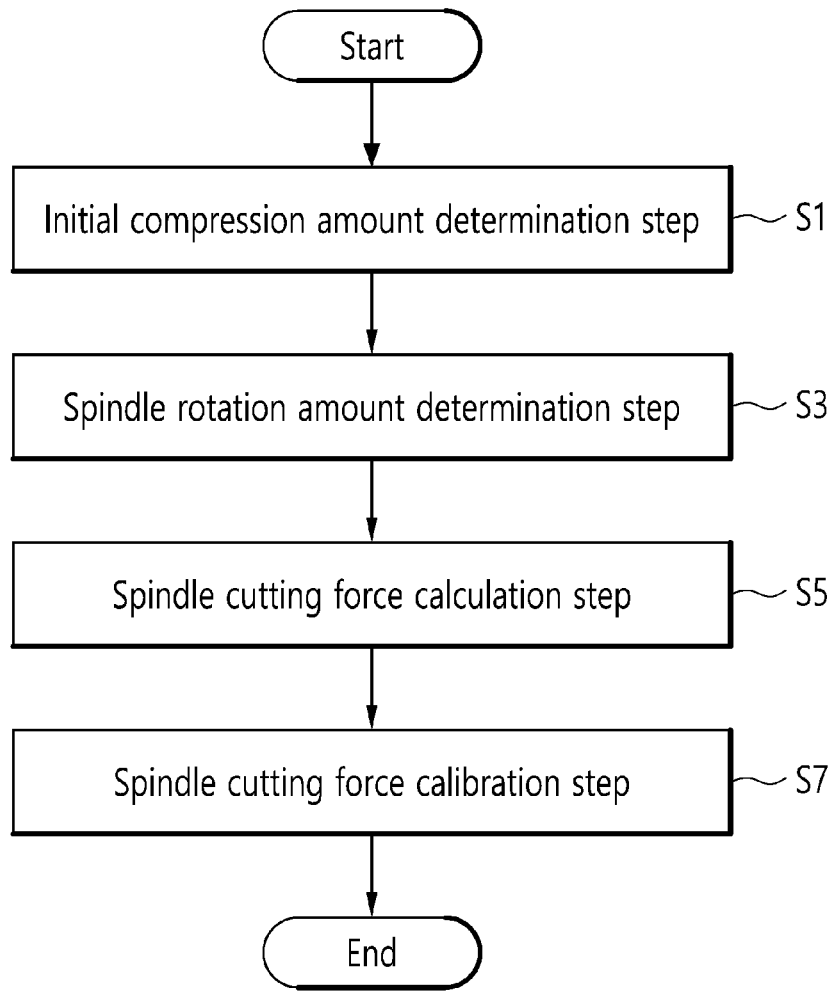
FIG. 15 is a flowchart schematically showing a method for estimating a cutting force of a machine tool using a vibration damping system according to an embodiment of the present disclosure.

FIG. 15 is a flowchart schematically showing a method for estimating a cutting force of a machine tool using a vibration damping system according to an embodiment of the present disclosure.

Referring further to FIG. 15, the method for estimating a cutting force of a machine tool using a vibration damping system according to an embodiment of the present disclosure includes an initial compression amount determination step (S1), a spindle rotation amount determination step (S3), a spindle cutting force calculation step (S5) and a spindle cutting force calibration step (S7).

<<S1>>

The initial compression amount determination step (S1) is a step of compressing the spring of each of the first compressor 310 and the second compressor 320 of the vibration damping system to an initial value. The control module 420 of the controller sets an initial compression amount by controlling the compression of the spring of each of the first compressor 310 and the second compressor 320 to the initial value according to the cutting process conditions for the structure 130.

<<S3>>

The spindle rotation amount determination step (S3) is a step of measuring and obtaining the rotational speed of the spindle 230 or the cutting force frequency and an angle change of the stator by supplying an electric current to the stator 240 of the vibration damping system to rotate the spindle 230 after the spring of the first compressor 310 and the second compressor 320 is compressed to the initial value in the initial compression amount determination step (S1).

The cutting force-frequency may be obtained by multiplying the measured rotational speed of the spindle 230 by the number of blades of the tool. The rotational speed of the spindle 230 and the angle change $\theta_s$ of the stator may be obtained by measuring through the sensor module 410.

<<S5>>

The spindle cutting force calculation step (S5) is a step of calculating an average cutting force based on the cutting force frequency, and the angle change $\theta_s$ of the stator obtained based on the rotational speed of the spindle 230 measured in the spindle rotation amount determination step (S3).

In the cutting force calculation step (S5), an average cutting torque may be estimated using the following [Equation 1] based on the cutting force frequency and the angle change $\theta_s$ by the rotation of the stator obtained in the spindle rotation amount determination step (S3):

$$\left|\frac{\theta_s}{T_s}\right| = \left|\frac{1}{-J_s\omega^2 + jc_s\omega + k_s}\right| \quad \text{[Equation 1]}$$

Here, $\theta_s$ is the angle of the stator, $T_e$ is the torque of the motor, to is the rotational speed of the rotor, $K_s$ is the stiffness of the spring, $J_s$ is an inertial moment of the stator, $C_s$ is a damping coefficient of the stator, and j is a complex number.

As described above, in the cutting force calculation step (S5), the average cutting torque estimated through the above [Equation 1] may be compared with the maximum cutting torque.

Calculating, by the controller, a cutting force based on the machining force generated by a collision between the spindle 230 and the structure 130 may include calculating the average cutting force of the spindle 230 based on at least one of the rotational speed of the spindle, the number of blades of the spindle or the angle of the stator, and turning the calculated average cutting force into data and outputting the data.

<<S7>>

The spindle cutting force calibration step (S7) is a step of calibrating a cutting force of the spindle based on the average cutting force calculated in the spindle cutting force calculation step.

In the spindle calibration step (S7), calibration for adjusting the compressor is performed to keep the cutting force constant, thereby improving the machining quality.

Through the control module, the amount of compression of the compressor or the amount of tension of the expander may be adjusted to keep the estimated cutting force constant, thereby improving the cutting quality on-line.

Through this process, the vibration damping system may be optimized by reducing the repulsive torque transmitted to the machine tool structure and minimizing the vibration. Additionally, the vibration damping system may classify according to the size, shape, and material of the structure based on accumulated data acquired by repeatedly performing manual or active calibration of the cutting force, and store operation information of the system with minimized vibration for each structure to reduce the optimization time of the system.

Hereinafter, an experimental example of evaluation and optimization of the system after manually damping the vibrations measured through the machine tool vibration damping method to which the vibration damping system according to an embodiment of the present disclosure is applied will be described with reference to FIGS. 16A and 16B.

<Experimental Example> Evaluation of Vibration Damping of System

In the system used in the experiment, an induction motor including a rotor and a stator is EMSynergy M800006, and a first damping stage including two bearings and two springs is applied. Additionally, the controller includes a DSP board, F283775 LAUNCHPAD, and a power module DRV8305EVM, and detects the behavior of the stator using a laser sensor (Keyence IL 100) and the behavior of the rotor using an encoder. Additionally, to implement the repulsive torque generated during machining of the spindle, a servo motor (Teknic M-2310P-LN-04K) is used and includes its encoder to measure the behavior. The servo motor is controlled through DRV8301-69M-KIT: F28069 and the power module DRV8305EVM. Each control module of the controller communicates to each other via CAN, and the control module and the output module create a communication environment via UART.

Figure 16A:
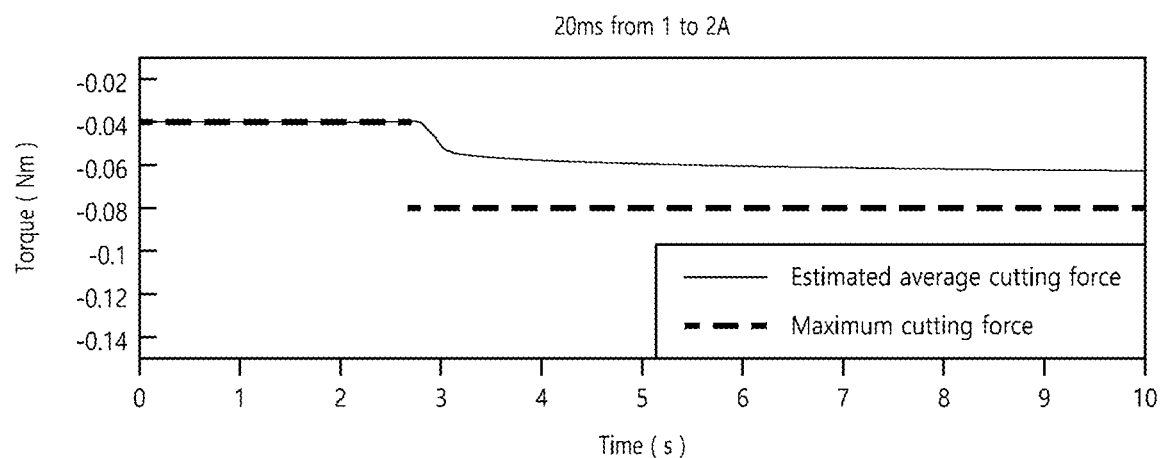
FIGS. 16A and 16B are diagrams schematically showing the output display of the decreased magnitude of maximum cutting force through a method for estimating a cutting force of a machine tool using a vibration damping system according to an embodiment of the present disclosure.
Figure 16B:
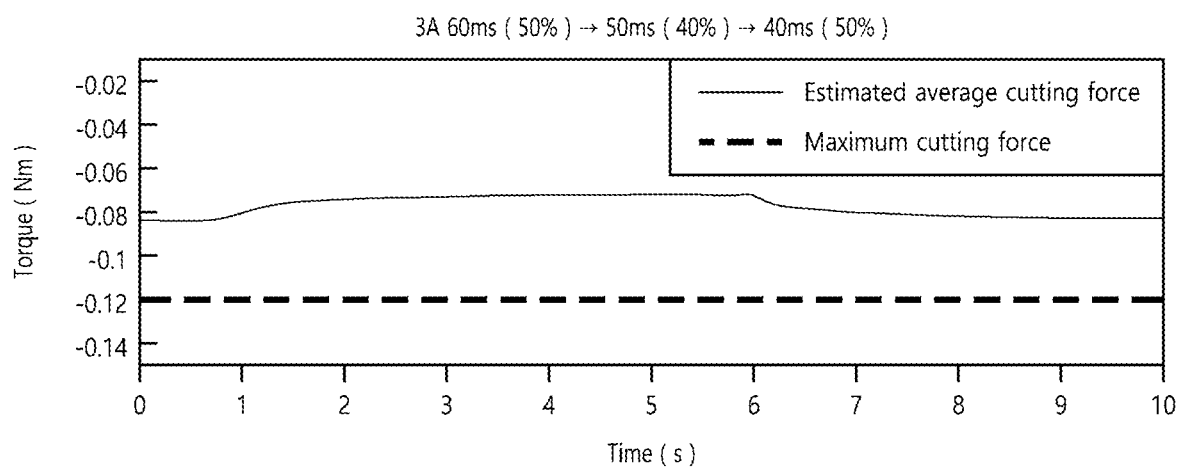

FIGS. 16A and 16B show the output display of the decreased magnitude of maximum cutting force through the method for estimating a cutting force of the present disclosure.

In the graphs of FIGS. 16A and 16B, the dashed line in bold indicates the maximum cutting force, and the black solid line indicates the average cutting force actually transmitted to the system. In particular, referring to FIG. 16A, the maximum cutting force is changed to 0.04 Nm, 0.08 Nm, but the average cutting force is maintained in a range which is smaller than 0.08 Nm, and thus it can be seen that even though the maximum cutting force is improved, the average cutting force transmitted to the system is damped.

Additionally, referring to FIG. 16B, the maximum cutting force is maintained at 0.12 Nm, but the average cutting force transmitted to the system is damped. Accordingly, it is possible to dissipate the repulsive torque corresponding to the cutting force detected through the vibration damping system according to the present disclosure in a situation in which the maximum cutting force is improved or constantly maintained as shown in FIGS. 16A and 16B, thereby improving the stability of the machine tool in which the vibration damping system is installed.

As described above, the method for estimating a cutting force of a machine tool using the vibration damping system according to the present disclosure may damp the vibrations of the machine tool by generating a repulsive force corresponding to the machining force generated in real-time by the collision between the spindle and the structure.

Through this, it is possible to improve the accuracy and productivity of the structure produced by the machine tool including the vibration damping system.

Although the present disclosure has been hereinabove described in detail by the embodiment disclosed with reference to the accompanying drawings, the above-described embodiments have been described using the preferred embodiments of the present disclosure, and thus the present disclosure should not be understood as being limited to these embodiments, and the scope of protection of the present disclosure should be understood in the appended claims and their equivalent concept.

| [Detailed Description of Main Elements] | |
|---|---|
| 1: Vibration damping system | |
| 110: Housing | 120: Base |
| 130: Structure | 210: Rotor |
| 211, 212: Rotor bearing | 220: Axis of rotation |
| 230: Spindle | 240: Stator |
| 241, 242: Stator bearing | 310: First compressor |
| 311: Spring | 313: Compression adjuster |
| 315: Compression strut | 320: Second compressor |
| 360: First expander | 361: Spring |
| 370: Second expander | 380: Spiral torsion spring |
| 410: Sensor module | 420: Control module |
| 430: Output module | |

The invention claimed is:

1. A vibration damping system, comprising:
a housing;
a stator rotatably positioned at an arbitrary angle in an internal space of the housing, and having a space inside;
a rotor of which at least a part is positioned in the space inside the stator, having an axis of rotation at a center, the axis of rotation matching a center of rotation of the stator, and rotating around the axis of rotation by an electromagnetic force;

a spindle mounted on an end of the axis of rotation of the rotor, and rotating with the rotor to cut a part of a structure;

a first expander having a front end connected to an outer surface of the stator and a rear end connected to the housing and applying an attractive force that pulls the stator when the stator rotates;

a second expander having a front end connected to the outer surface of the stator and a rear end connected to the housing, positioned at a location symmetric to the location of the first expander with respect to the axis of rotation, and applying an attractive force that pulls the stator in an opposite direction from the attractive force by the first expander when the stator rotates;

a first compressor having a front end connected to the outer surface of the stator and a rear end connected to the housing and applying a repulsive force that pushes the stator using an elastic force of a first spring; and a second compressor having a front end connected to the outer surface of the stator and a rear end connected to the housing, positioned at a location symmetric to the location of the first compressor with respect to the axis of rotation, and applying a repulsive force that pushes the stator using an elastic force of a second spring.

2. The vibration damping system according to claim 1, further comprising:

a controller to calculate a cutting force based on vibration of the stator or rotational motion of the spindle, and control the first compressor or the second compressor.

3. The vibration damping system according to claim 2, wherein a strength of the repulsive force that pushes the stator by the first compressor or the second compressor is adjusted by the control of the controller.

4. A method for estimating a cutting force of a machine tool using a vibration damping system according to claim 1, the method comprising:

an initial compression amount determination step of compressing both the first spring of the first compressor and the second spring of the second compressor to an initial value;

a spindle rotation amount determination step of measuring a cutting force frequency and an angle change of the stator by supplying an electric current to the stator of the vibration damping system to rotate the spindle after the spring of the first compressor and the second compressor is compressed to the initial value in the initial compression amount determination step;

a spindle cutting force calculation step of calculating an average cutting force based on the cutting force frequency and the angle change of the stator measured in the spindle rotation amount determination step; and a spindle cutting force calibration step of calibrating the cutting force of the spindle based on the average cutting force calculated in the spindle cutting force calculation step.

5. The method for estimating a cutting force of a machine tool using a vibration damping system according to claim 4, further comprising:

a controller to calculate a cutting force based on vibration of the stator or rotational motion of the spindle, and control the first compressor or the second compressor.

6. The method for estimating a cutting force of a machine tool using a vibration damping system according to claim 5, wherein a strength of the repulsive force that pushes the stator by the first compressor or the second compressor is adjusted by the control of the controller.

7. A vibration damping system, comprising:

a housing;

a stator rotatably positioned at an arbitrary angle in an internal space of the housing, and having a space inside;

a rotor of which at least a part is positioned in the space inside the stator, having an axis of rotation at a center, the axis of rotation matching a center of rotation of the stator, and rotating around the axis of rotation by an electromagnetic force;

a spindle mounted on an end of the axis of rotation of the rotor, and rotating with the rotor to cut a part of a structure;

a first expander having a front end connected to an outer surface of the stator and a rear end connected to a base of the housing, positioned such that an imaginary lengthwise central axis is parallel to the axis of rotation of the rotor, and applying an attractive force that pulls the stator to give positive rotation stiffness of the stator when the stator rotates;

a second expander having a front end connected to the outer surface of the stator and a rear end connected to the base of the housing at a location symmetric to the location of the first expander with respect to the axis of rotation, positioned such that an imaginary lengthwise central axis is parallel to the axis of rotation of the rotor, and applying an attractive force that pulls the stator to give positive rotation stiffness of the stator when the stator rotates;

a first compressor having a front end connected to the outer surface of the stator and a rear end connected to the base of the housing, positioned such that an imaginary lengthwise central axis is parallel to the axis of rotation of the rotor, and applying a repulsive force that pushes the stator using an elastic force of a first spring; and a second compressor having a front end connected to the outer surface of the stator and a rear end connected to the base of the housing, positioned at a location symmetric to the location of the first compressor with respect to the axis of rotation, and applying a repulsive force that pushes the stator using an elastic force of a second spring.

8. The vibration damping system according to claim 7, further comprising:

a controller to calculate a cutting force based on vibration of the stator or rotational motion of the spindle, and control the first compressor or the second compressor.

9. The vibration damping system according to claim 8, wherein a strength of the repulsive force that pushes the stator by the first compressor or the second compressor is adjusted by the control of the controller.

10. A method for estimating a cutting force of a machine tool using a vibration damping system according to claim 7, the method comprising:

an initial compression amount determination step of compressing both the first spring of the first compressor and the second spring of the second compressor to an initial value;

a spindle rotation amount determination step of measuring a cutting force frequency and an angle change of the stator by supplying an electric current to the stator of the vibration damping system to rotate the spindle after the spring of the first compressor and the second compressor is compressed to the initial value in the initial compression amount determination step;

a spindle cutting force calculation step of calculating an average cutting force based on the cutting force frequency and the angle change of the stator measured in the spindle rotation amount determination step; and a spindle cutting force calibration step of calibrating the cutting force of the spindle based on the average cutting force calculated in the spindle cutting force calculation step.

11. The method for estimating a cutting force of a machine tool using a vibration damping system according to claim 10, further comprising:
a controller to calculate a cutting force based on vibration of the stator or rotational motion of the spindle, and control the first compressor or the second compressor.

12. The method for estimating a cutting force of a machine tool using a vibration damping system according to claim 11, wherein a strength of the repulsive force that pushes the stator by the first compressor or the second compressor is adjusted by the control of the controller.

13. A vibration damping system, comprising:
a housing;
a stator rotatably positioned at an arbitrary angle in an internal space of the housing, and having a space inside;
a rotor of which at least a part is positioned in the space inside the stator, having an axis of rotation at a center, the axis of rotation matching a center of rotation of the stator, and rotating around the axis of rotation by an electromagnetic force;
a spindle mounted on an end of the axis of rotation of the rotor, and rotating with the rotor to cut a part of a structure;
an expander positioned between a base on the other side of the rotor at which the spindle is disposed at one end and the stator, one side connected to the stator and the other side connected to the base, and applying an attractive force that pulls the stator in a direction opposite to a direction in which the stator rotates at the arbitrary angle;
a first compressor having a front end connected to an outer surface of the stator and a rear end connected to the housing, and applying a repulsive force that pushes the stator using an elastic force of a first spring; and
a second compressor having a front end connected to the outer surface of the stator and a rear end connected to the housing, positioned at a location symmetric to the location of the first compressor with respect to the axis of rotation, and applying a repulsive force that pushes the stator using an elastic force of a second spring.

14. The vibration damping system according to claim 13, further comprising:
a controller to calculate a cutting force based on vibration of the stator or rotational motion of the spindle, and control the first compressor or the second compressor.

15. The vibration damping system according to claim 14, wherein a strength of the repulsive strength that pushes the stator by the first compressor or the second compressor is adjusted by the control of the controller.

16. A method for estimating a cutting force of a machine tool using a vibration damping system according to claim 13, the method comprising:
an initial compression amount determination step of compressing both the first spring of the first compressor and the second spring of the second compressor to an initial value;
a spindle rotation amount determination step of measuring a cutting force frequency and an angle change of the stator by supplying an electric current to the stator of the vibration damping system to rotate the spindle after the spring of the first compressor and the second compressor is compressed to the initial value in the initial compression amount determination step;
a spindle cutting force calculation step of calculating an average cutting force based on the cutting force frequency and the angle change of the stator measured in the spindle rotation amount determination step; and
a spindle cutting force calibration step of calibrating the cutting force of the spindle based on the average cutting force calculated in the spindle cutting force calculation step.

17. The method for estimating a cutting force of a machine tool using a vibration damping system according to 16, further comprising:
a controller to calculate a cutting force based on vibration of the stator or rotational motion of the spindle, and control the first compressor or the second compressor.

18. The method for estimating a cutting force of a machine tool using a vibration damping system according to 17, wherein a strength of the repulsive strength that pushes the stator by the first compressor or the second compressor is adjusted by the control of the controller.

* * * * *